Sept. 12, 1950  J. ASMUSSEN  2,522,154
METHOD AND MEANS FOR CUTTING, PUNCHING, BLANKING, AND THE LIKE
Filed Feb. 24, 1947  6 Sheets-Sheet 1

Inventor
Jes Asmussen
By Joseph Rossman & Harry G. Shapiro
Attys.

Sept. 12, 1950 J. ASMUSSEN 2,522,154
METHOD AND MEANS FOR CUTTING, PUNCHING,
BLANKING, AND THE LIKE
Filed Feb. 24, 1947 6 Sheets-Sheet 2

Inventor
Jes Asmussen
By Joseph Rossman +
Harry G. Shapiro
Attys.

Patented Sept. 12, 1950

2,522,154

UNITED STATES PATENT OFFICE 2,522,154

METHOD AND MEANS FOR CUTTING, PUNCHING, BLANKING, AND THE LIKE

Jes Asmussen, Appleton, Wis., assignor to Marathon Corporation, Rothschild, Wis., a corporation of Wisconsin Application February 24, 1947, Serial No. 730,516

12 Claims. (Cl. 164—99)

The invention relates to a rotary cutting, blanking and punching machine. Also, the invention concerns method and means for ejecting the cut-outs from a web.

In the prior art devices for cutting, blanking and punching, the attainment of high-speed production has been limited by numerous factors. In machines of the reciprocating type, the very nature of the mechanism for reciprocating the punches with respect to the anvil bed has limited production to approximately 175 feet per minute. It has been recognized that punching machines of the rotary type are capable of faster operation than of the recirocating type. However, prior art rotary machines have required considerable maintenance. Frequent re-sharpening and replacement of the cutting devices or punches have been necessary. The prior art inability to maintain the requisite close tolerances of cutting edge on the punch with respect to the anvil roll has resulted in early dulling of the cutting edge as well as scarring of the anvil roll. The time consumed in replacing the dulled punches vitiated most of the advantages of the high-speed rotary method of cutting, punching or blanking a web of sheet material.

One object of this invention is to provide means for radially adjusting the punch with respect to the punch carrier roll in which it is mounted. This invention permits radial adjustment to be made to tolerances heretofore unattainable so that the cutting means in effect becomes a functional part of the support in which it is mounted. The cutting edge of the punch thus may be adjusted and fixed to subtend an arc equal to the radius of the anvil roll with which it is cooperating. In this fashion the time consumed in the maintenance and replacement of the punching means as well as the anvil roll is reduced to a minimum. Web sheet material may be run through the cutting punching or blanking means at speeds in excess of 600 feet a minute with little time lost due to the idleness of the machine normally consumed in replacing worn and dulled cutting dies and scarred anvil roll.

Another object of the invention is to provide means for locking the punch in place on the carrier roll so that the fine adjustment of the cutting edge with respect to its support and the anvil roll may be maintained.

Another object of the invention is to provide simple and easy means, within the skill of the ordinary mechanic or the operator, for adjusting the punch with respect to the anvil roll and for removing and replacing said punch from and upon its support.

Another object of the invention is to provide a punch assembly which permits adjustment of the cutting edge of the punch in a fixed predetermined position prior to its placement within the punch carrier roll or support. This construction permits the fine adjustment of the cutting edge with respect to the anvil roll to be made away from the machine itself. The operator need only insert and fasten the punch assembly in the support or punch carrier roll; no further adjustment is necessary.

Another object of the invention is to provide a method and means for aiding the removal of the blank from the fast-moving web as the web is subjected to the punching operation.

Other objects and advantages of the present invention will more fully appear from the following description and drawings, wherein.

Figures 1, 9, 10, 11, 12:
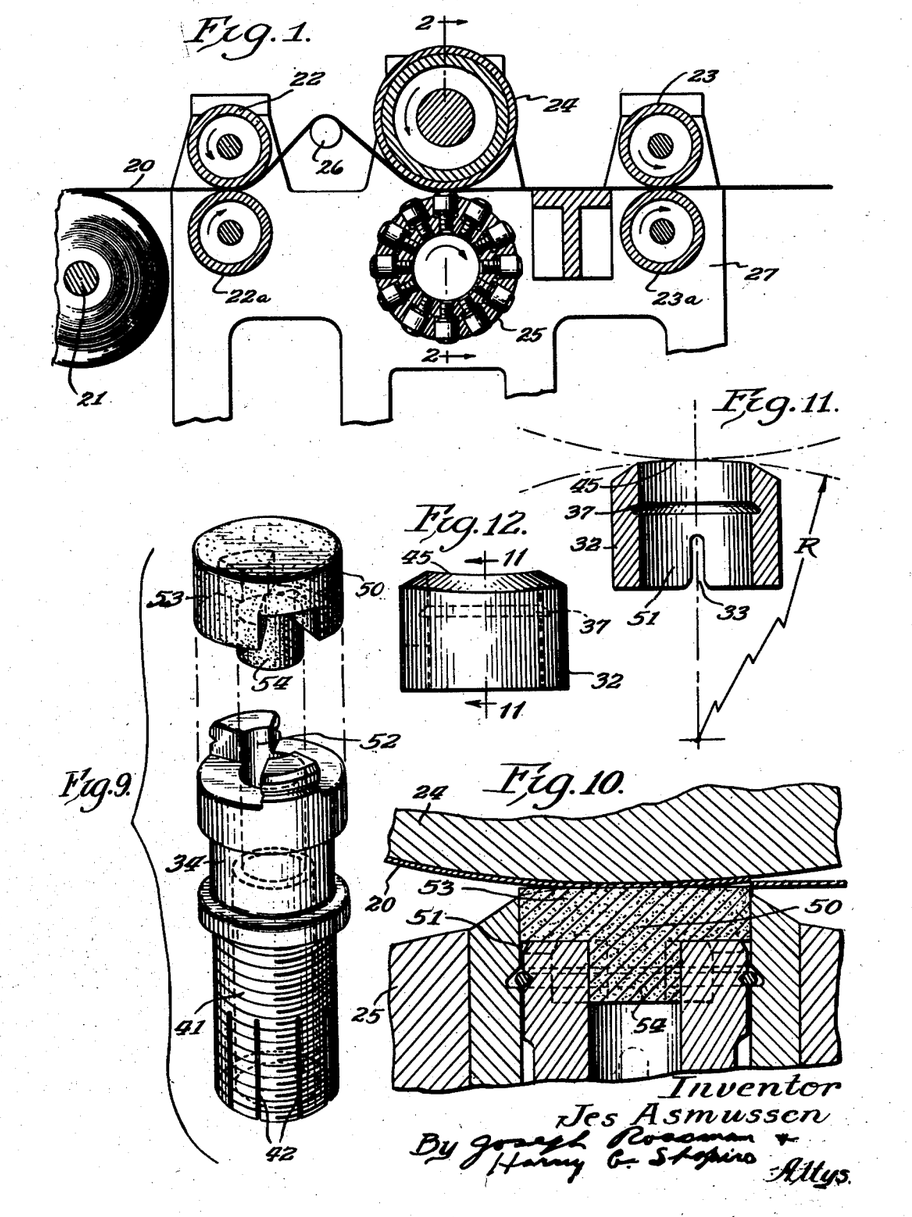
Figure 1 is a side view of the general web feeding and punch assembly.
Figure 9 is an exploded view illustrating the relationship of an ejector and the punch holder.
Figure 10 is a detailed view illustrating the action of an ejector and punch upon the web.
Figure 11 is a vertical section taken along the line 11—11 of Figure 12 illustrating the curvature initially imparted to a punch.
Figure 12 is an elevational view of the cutting die or punch.

Referring to Figure 1, a web 20 is led off a supply roll 21 and fed through the punching device by means of power driven feed rolls 22, 22a, 23, and 23a. The web is run between a hardened steel anvil roll 24 and a punch carrier roll 25. To facilitate the most advantageous blanking of the web a guide roll 26 is located above the nip of the anvil and punch carrier rolls so that the web contacts a segment of the anvil roll prior to being delivered into the nip. The feed, guide, anvil and punch carrier rolls are supported on the frame 27.

Figure 2:
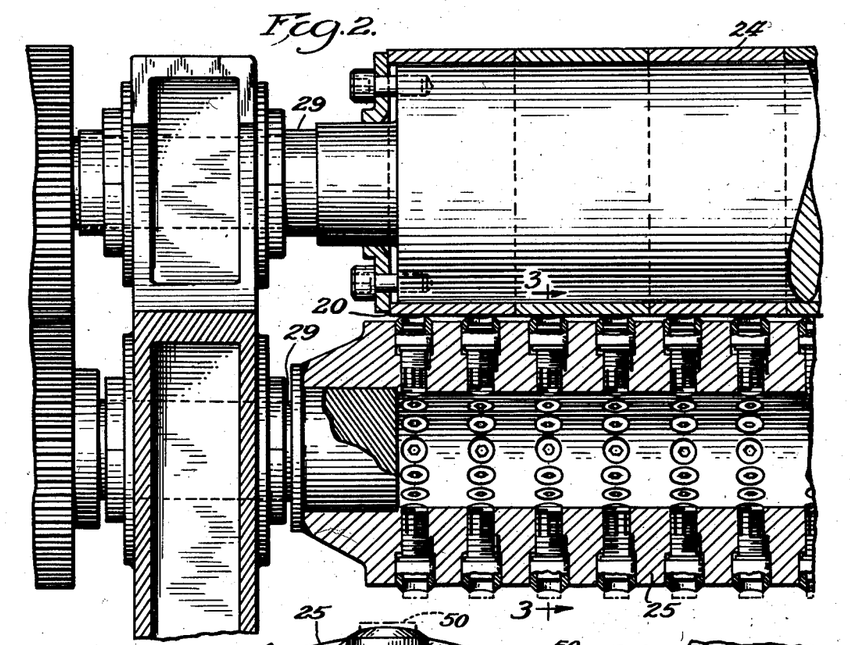
Figure 2 is a vertical section taken along the line 2—2 of Figure 1 showing the relationship of anvil and punch carrier rolls with the punches mounted within the latter.

As shown in Figure 2, anvil roll 24 and punch carrier roll 25 are mounted on shafts 28 and 29, respectively. These rolls are power driven to rotate in opposite directions at the same speed.

Figures 3, 4, 5:
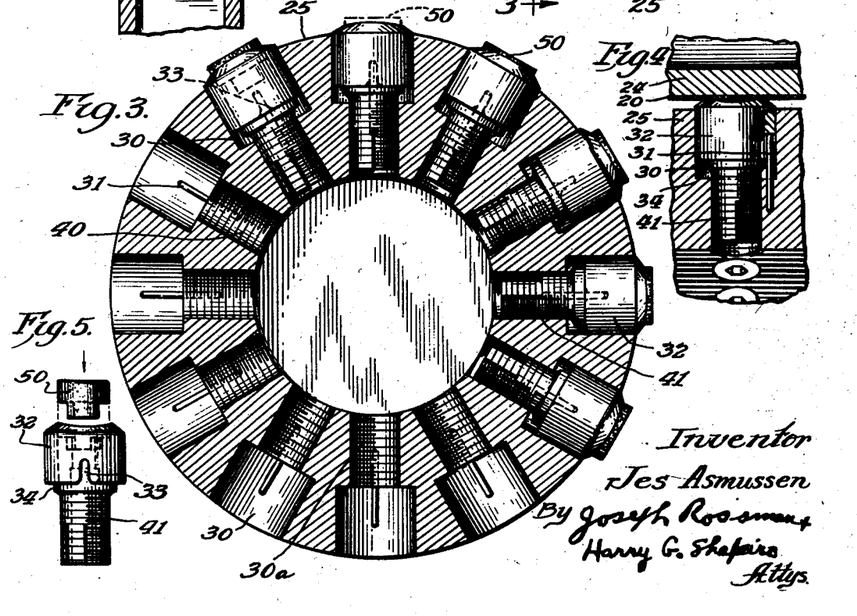
Figure 3 is a vertical section taken along the line 3—3 of Figure 2 showing a plurality of punches mounted within a zone of the carrier roll; some of the punches and holders therefor being omitted for illustrative purposes only.
Figure 4 is a view illustrating the action of an individual punch upon a web and means for preventing rotation of the punch on its support.
Figure 5 illustrates an embodiment of a blank ejector with relation to the punch and punch holder in disassembled relation.

Any desired number of punches or cutting dies may be mounted on the punch carrier roll depending upon the size of the punches and the diameter and length of the carrier roll. As shown in Figure 3, twelve punches may be arranged on a circumference of the roll in a plurality of rows, the number of rows being limited only by the length of the roll.

Figures 6, 7, 8:
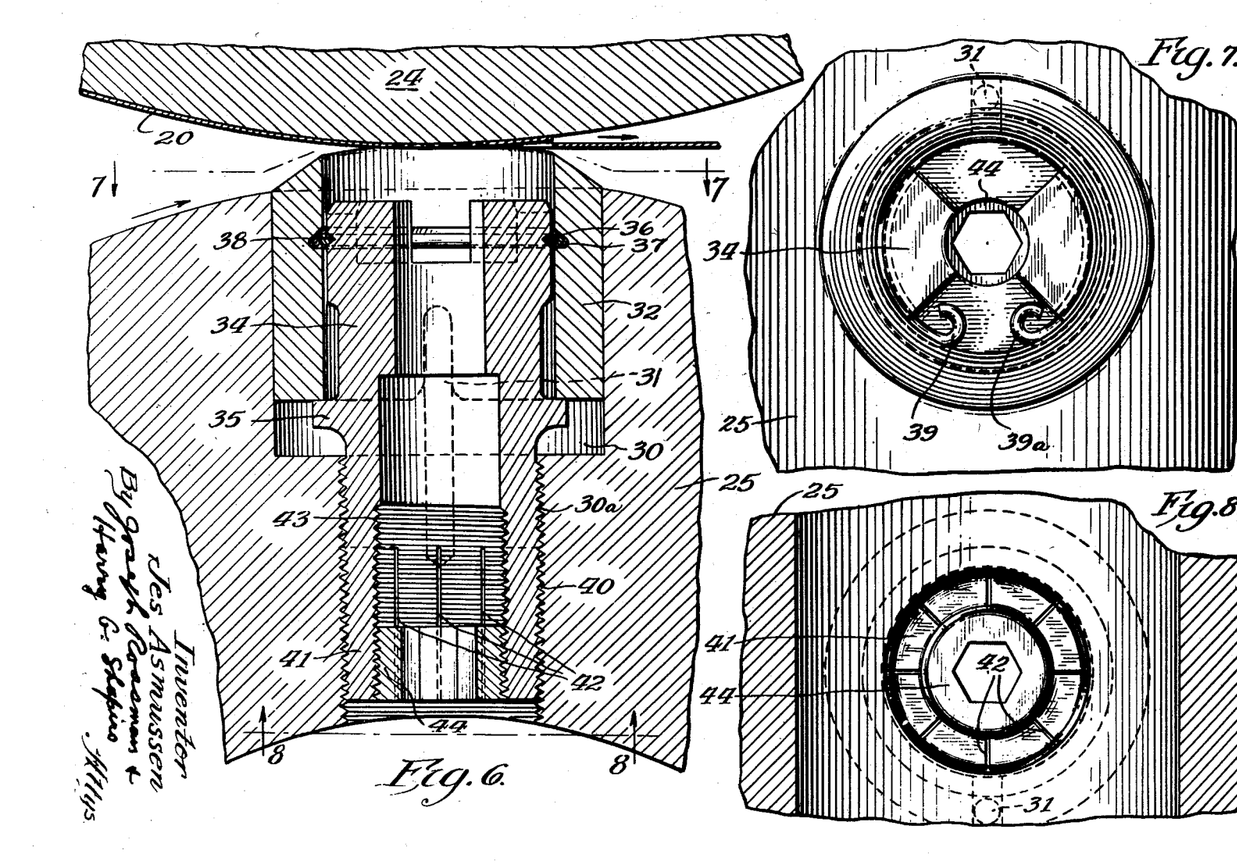
Figure 6 is a detailed view, partly in cross section, of the means for mounting a punch within the punch carrier roll (the ejector is omitted for the purposes of clarity)
Figure 7 is a plan view of the punch and holder taken along the line 7—7 of Figure 6.
Figure 8 is a bottom view of the punch and holder taken along the line 8—8 of Figure 6.

Figure 6 illustrates the manner in which an individual punch is mounted in the punch carrier roll. The punch carrier roll 25 is provided with an opening or socket 30 having a lower portion thereof 30a of reduced diameter. Within the socket and fixed to the carrier roll there is provided a punch locating pin 31. The punch or cutting die 32 has a slot 33 therein which in conjunction with locating pin 31 prevents the punch from turning in the socket. The slot 33 is positioned in predetermined position with respect to the curvature imparted to the cutting edge of the punch 32. Punch 32 encircles a hollow punch holder 34, the bottom portion of the punch resting on a shoulder 35 of said holder. The punch 32 is pressed and held against the shoulder 35 of the punch holder by means of a snap ring 36 of spring steel. The punch 32 is provided with an annular groove 37 on the inner circumference thereof. An annular groove 38 is provided on the outer circumference of the punch holder 34. The grooves 37, 38 and snap ring 36 are so dimensioned that the snap ring forms a bead which allows rotation of the punch with respect to the punch holder but prevents movement in a direction parallel to the longitudinal axis of the punch holder. Depending upon the dimensions of grooves 37 and 38 and the expansible or compressible characteristics of the snap ring, the diameter of the snap ring may be diminished or increased by pulling together or pushing apart the ends 39 and 39a with a suitable tool. Thus the bead formed by the ring may be expanded or contracted to a position allowing removal of the punch from the punch holder.

The lower portion of the socket 30a is threaded as at 40 to receive the threaded portion 41 of the punch holder. The threaded portion of the punch holder possesses vertical slots 42 around its lower circumference to thereby afford an expansible fit with the threaded portion of the socket. The inside surface of the punch holder is provided with a tapered thread 43 adapted to coact with a threaded tapered locking plug 44. The plug 44 is tapered with a diameter increasing from top to bottom and may have a hexagonal contour on its inner surface to facilitate its turning by a suitable tool. It will be observed that the punch holder is hollow throughout its length to permit accessibility to the locking plug, as well as the snap ring, with suitable tools from the top surface of the punch carrier roll.

To radially adjust the cutting die or punch within the punch carrier roll so that the cutting surface of the die is on a radius equal to the radius of the anvil roll, said die is first positioned on the punch holder by means of the snap ring. Prior to threading the punch holder within the threaded socket the cutting die may be rotated about the holder; the lower end of the die will rotatably slide on the shoulder 35, the snap ring permitting rotation of the die with respect to the punch holder. Movement in a direction parallel to the longitudinal axis of the punch holder, however, is restrained by the snap ring. The described assembly is positioned in the socket 30 with the slot 33 of the punch or cutting die aligned with locating pin 31. The holder with the punch secured thereto is then threaded into the threaded socket by means of a suitable tool inserted within the punch holder. The punch is now capable of radial movement only with respect to the carrier punch roll, the slot and locating pin preventing rotation of the punch within the socket. For reasons which will hereinafter appear, any radial or rotational movement of the punch after it has been adjustably secured within the punch carrier roll in predetermined relationship with the anvil roll will destroy all advantages of the rotary cutting means. The position of the punch is then radially adjusted by threading the portion 40 of the holder in threaded portion 30a of the socket so that its cutting edge is on a radius equal to the radius of the anvil roll with which it must cooperate to blank, punch or cut the web. The plug 44 is then tightened within the punch holder and the taper thereof will spread the slotted, threaded portion 41 of the punch holder against the adjacent wall of the punch carrier roll. The holder and concomitantly the punch secured thereto are now firmly locked to prevent rotational or radial movement.

As shown in Figure 11, the punch is initially ground on a radius R so that the cutting edge 45 thereof possesses a curvature equal to an arc of the radius of the cooperating anvil roll. With the extremely fine radial adjustment of the punch which can be achieved by the means hereinbefore described, the cutting edge of the punch can kiss the anvil roll to cut the web with a perfect smooth-line rolling contact and thereby maintain the initial curvature of the cutting edge. The blunting of the cutting edge with the necessity for re-sharpening and replacement and the ensuing loss of machine operating time is kept to a minimum.

To aid and facilitate the ejection of the cut-out or punched area from the web, an ejector plug 50 of compressible material such as sponge rubber may be pressed or squeeze fitted within the center opening 51 of the punch 32 and the central opening 52 of the punch holder 34. As shown in Figures 5, 9, and 10, the ejector plug 50 may be formed with a punch fitting portion 53 and a punch holder fitting portion 54 of lesser diameter. The ejector plug 50 is dimensioned so that after squeezing the same within the punch and holder, a portion thereof will still protrude above the cutting edge of the punch as shown in Figure 10. Thus at the nip of the anvil roll and the punch cutting edges, the compressed ejector plug will act to expand and cooperate with the cutting edge to push or eject the cut-out from the moving web. The ejector plug can of course be removed to permit access to the snap ring and locking plug through the central opening in the punch holder.

Figure 13:
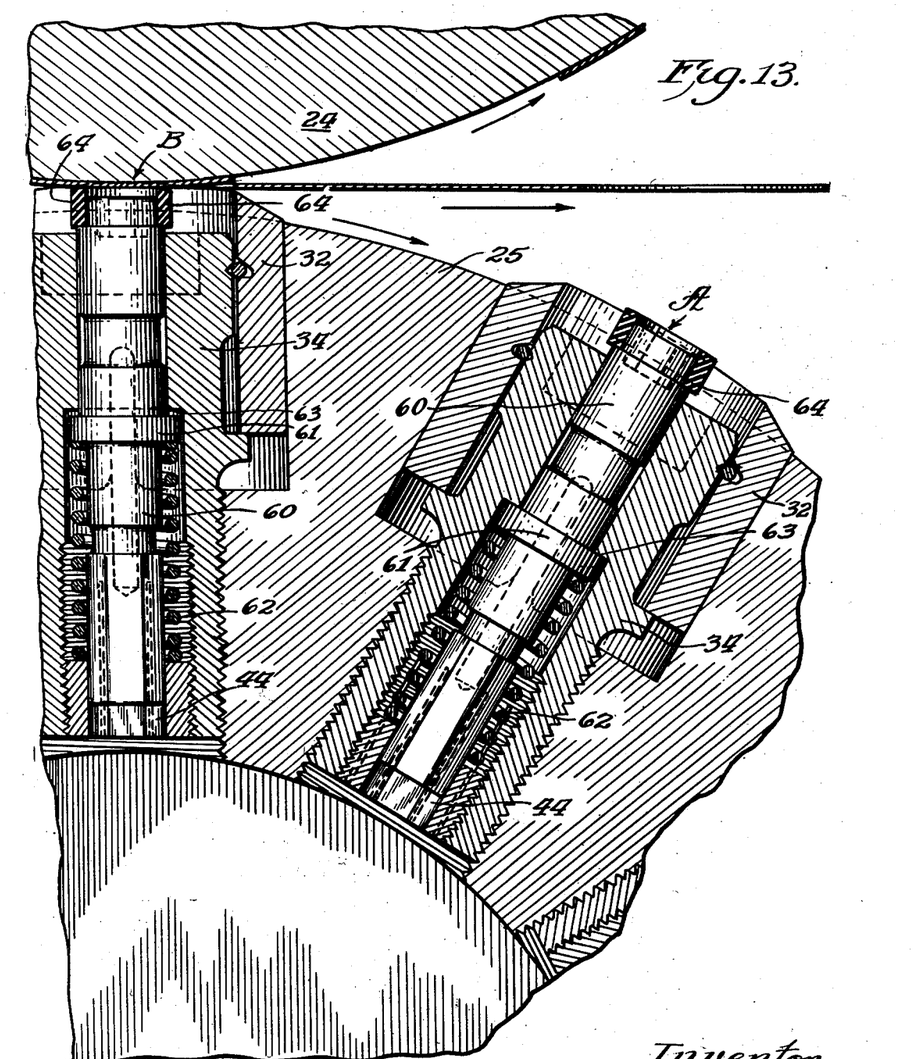
Figure 13 shows another embodiment of a blank ejecting means.

Figure 13 illustrates a modification of the described ejector means. In this embodiment a hollow ejector spindle 60 provided with a flange 61 is disposed within the punch holder 34. A compression spring 62 is located with one end thereof against the flange 61 and the other end against the top of the locking plug 44. Normally the spring will urge the spindle to the limit of its upper motion which is when the flange rests against a stop 63 on the punch holder. The top of the spindle has fitted thereon a sleeve 64 of rubber or other suitable material.

As shown at A in Figure 13, the ejector spindle 60 is normally in its outermost position with the sleeve 64 projecting beyond the cutting edge of the punch 32. When the punch is at the nip, shown at B, pressure of the anvil roll 24 upon the sleeve is translated to the spring to compress the same. The reacting force of the spring 62 aids the punch to eject the blank from the web.

Figures 14, 15:
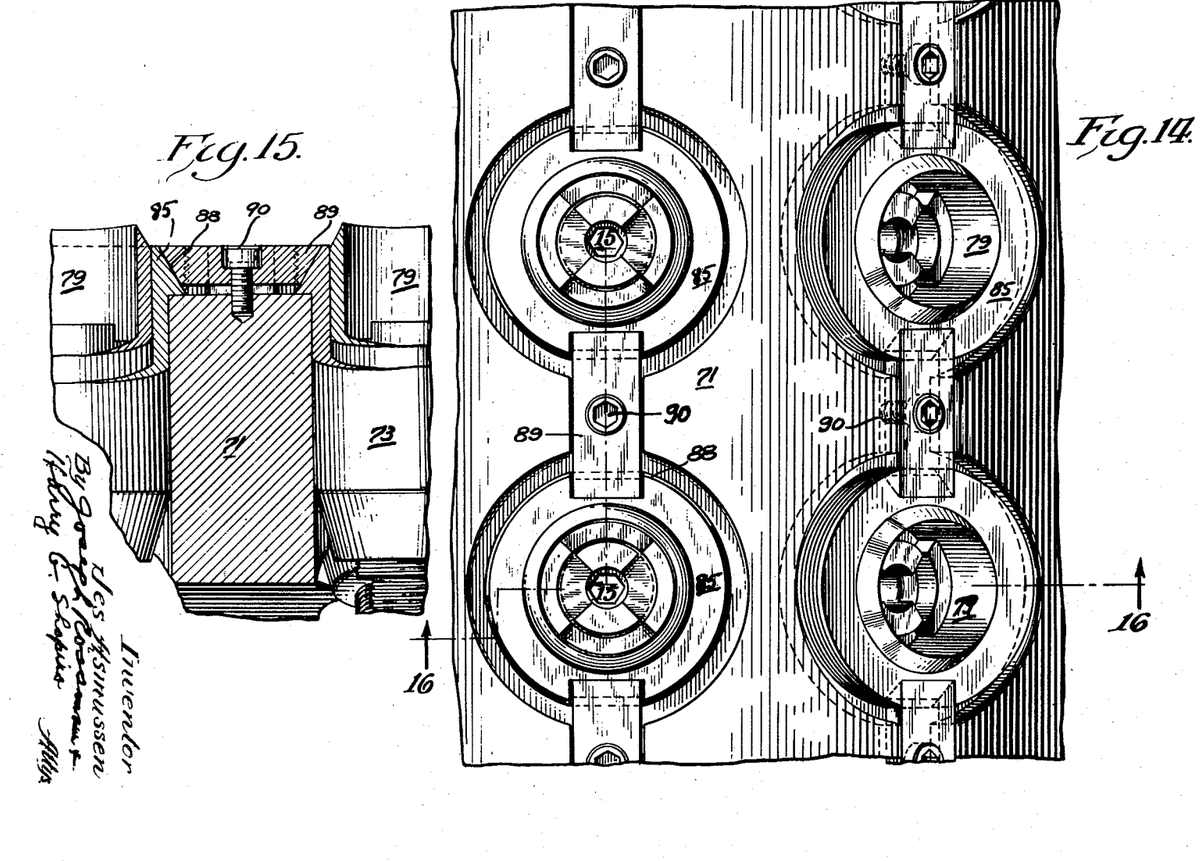
Figure 14 is a plan view of a punch carrier roll wherein the punches are each contained and secured within readily removable sleeves.
Figure 15 is a section taken along the line 15—15 of Figure 14 and illustrates means for securing the punch retaining sleeves within the carrier roll.
Figure 16:
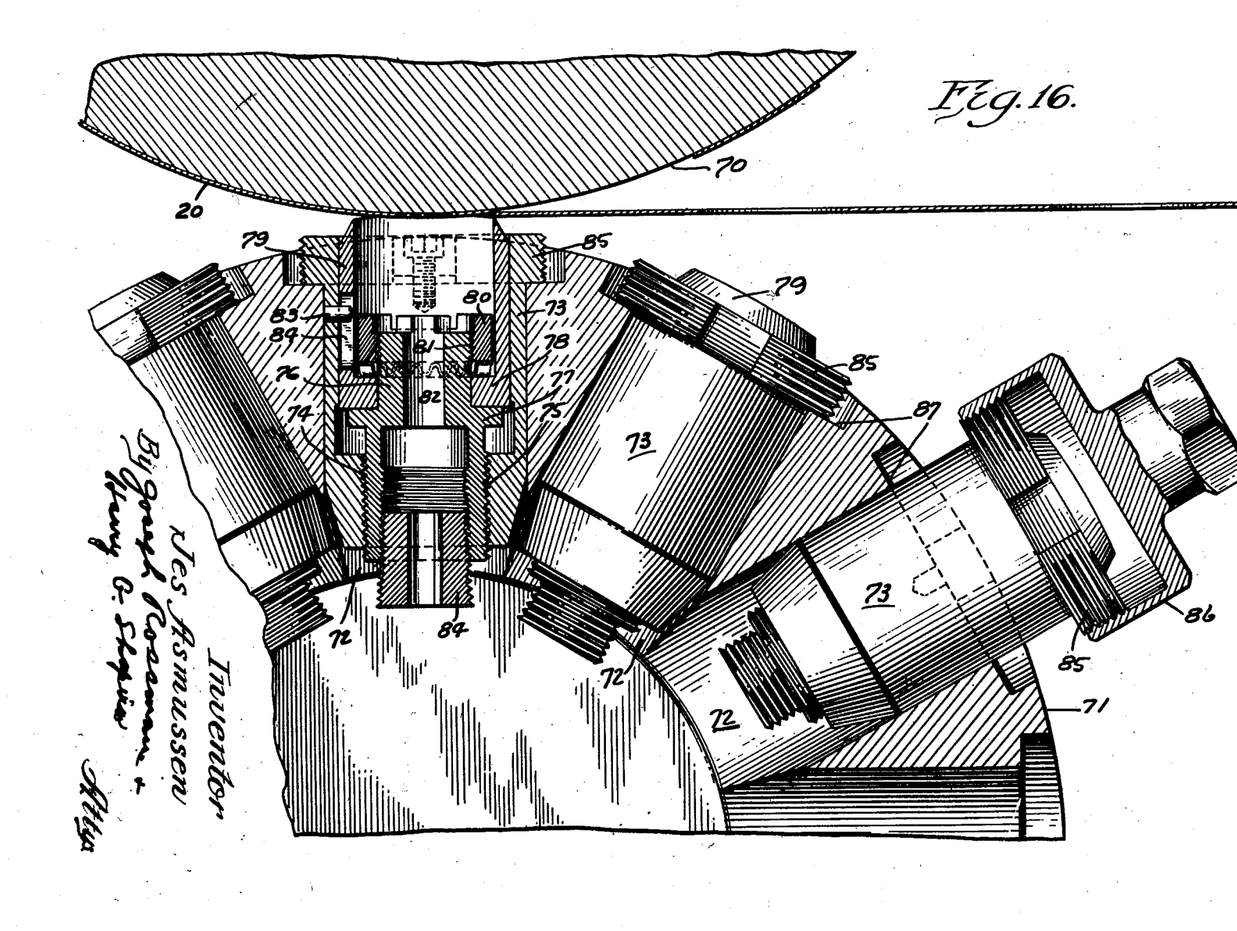
Figure 16 is a detailed view, partly in cross-section, taken along the line 16—16 of Figure 14.

Figures 14, 15, and 16 illustrate another means for securing the punch to the punch holder, as well as means for containing the entire punch assembly within a sleeve adapted for quick and easy insertion and removal as a unit within and from the punch carrier roll.

Cooperating with an anvil roll 70 is a punch carrier roll 71. Punch carrier roll 71 is reamed to provide sockets 72. Adapted to snugly fit within a socket 72 is a punch assembly retaining sleeve 73. The sleeve 73 is provided with a threaded portion 74 for engagement with the threaded portion 75 on a hollow punch holder 76. Punch holder 76 possesses a flange 77 upon which rests the thickened portion 78 of a punch or cutting die 79. To secure punch 79 to punch holder 76, a nut 80 is threaded upon a threaded portion 81 on the upper end of the punch holder. A spring washer 82 is disposed intermediate the nut 80 and the thickened portion 78 of the punch. A locating pin 83 secured to sleeve 73 is adapted to cooperate with a longitudinal slot 84 in the punch 79. The locking pin and slot arrangement permits movement of the punch in a direction parallel to the longitudinal axis of the sleeve 73 but prevents the punch from rotating within said sleeve. A threaded tapered locking plug 84 cooperates with the threaded inner surface of the punch holder for the same purpose and function as hereinbefore described.

The punch assembly sleeve 73 is provided at its upper end with a collar 85 adapted for threaded engagement with a suitable tool such as shown at 86. In this manner the sleeve containing the punch assembly may be quickly and easily inserted or removed from the punch carrier roll.

To securely hold the punch assembly sleeves within the sockets 72, the collar of each sleeve has bevelled notches 88 adapted to receive wedges 89. Screws 90 which thread through the wedges and into the punch carrier roll 71 prevent movement of the sleeves with respect to said carrier roll.

A punch having a cutting edge ground or sharpened on a radius equal to the radius of the anvil roll may be assembled within the punch rotating sleeve as follows. The punch 79 is secured to the punch holder 76 by the nut 80. With the slot 84 aligned with the locking pin 83 to prevent rotation of the punch with respect to the punch holder, the threaded portion 75 of the punch holder is threaded within the sleeve 73 at 74. The radius of the anvil roll being known, the distance from the axis of the punch carrier roll to the top surface of the sleeve being known, it is a simple matter to adjust the cutting edge of the punch to a position where its cutting edge is on a radius equal to the radius of the anvil roll. A set of sleeves with the punches accurately positioned therein may be kept in stand-by position. When the punches in the machine are removed for resharpening, the stand-by set of sleeves can be quickly and easily inserted and secured within the punch cylinder roll.

The sleeve construction or unitary punch assembly means described may be utilized with the punch assembly arrangement illustrated in Figures 1-13, inclusive. Also the ejector means hereinbefore described may be used in conjunction with the punch assembly means shown in Figures 14, 15, and 16.

It is of course within the scope of my invention to reverse the position of the punch carrier and anvil rolls. This arrangement is desirable when the finished product is the die cut web, and the blanks are waste. When the web is of paper, it has been found that the blanks have a tendency to adhere to the anvil roll. A reciprocating doctor blade cooperating with the surface of the anvil roll may be used to remove the blanks and deposit them into a waste container which may rest on the floor. This same arrangement, however, can be used when the blanks punched out of the web are the desired finished product and the remainder of the web is waste. The container will then be the repository of the desired blanks.

It is also understood that the punch or cutting die may be of any configuration whether circular, semi-circular, square, triangular, hexagonal, notched, etc. The fine precision punching attainable with my invention permits the cutting out of predetermined patterns on the web.

The web material to be punched, cut or blanked may be paper, glassine, metal, regenerated cellulose, rubber, synthetic rubber, synthetic resin films, felt, textiles, etc. The fine tolerance adjustability of the cutting edge of the die with respect to the anvil roll permits high-speed blanking, cutting or punching of extremely thin sheet material, which in conjunction with the ejecting means disclosed, assures clean cut edges of the blanks and web.

It is further understood that the blank or cutout ejector means described, while assuring the removal of the cutout from the sheet material, is not essential to accomplish the cutting, punching or blanking if the sheet material possesses substantial body or thickness.

Furthermore, the ejector means disclosed may be used in combination with a punch, cutting die or blanking means of the reciprocating or flat bed type.

The present invention may be embodied in other specific forms without departing from the essential attributes thereof. It is desired that the present specific embodiment be considered in all respects as illustrative and not restrictive, reference being had to the appended claims rather than to the aforegoing description to indicate the scope of the invention.

I claim:

1. A rotary cutting, punching and blanking machine or the like comprising a rotatable anvil roll, a rotatable punch carrier roll, a threaded socket radially disposed within said punch carrier roll, a threaded punch holder fitted within said socket, a punch removably fixed to said punch holder, said punch having a cutting edge of predetermined contour equal to the radius of said anvil roll, said punch holder being radially adjustable within said socket, means for preventing rotation of the punch with respect to the punch carrier roll and means for locking the punch holder against radial movement.

2. A rotary cutting, punching, and blanking machine or the like comprising a rotatable anvil roll, a rotatable punch carrier roll, a threaded socket radially disposed within said carrier roll, a threaded punch holder fitted within said socket, a punch having a cutting edge of predetermined contour equal to the radius of said anvil roll, an annular groove on the inner circumference of said punch, an annular groove on the outer circumference of said punch holder, a snap ring disposed within said grooves for rotatably securing said punch to the punch holder and said punch holder being radially adjustable within said socket.

3. A rotary cutting, punching and blanking machine or the like comprising a rotatable anvil roll, a rotatable punch carrier roll, a threaded socket radially disposed within said punch carrier roll, a locating pin within the socket, a threaded punch holder fitted within said socket, a punch removably fixed to said punch holder, said punch having a cutting edge of predetermined contour equal to the radius of said anvil roll, a slot within said punch aligned with said locating pin to hold the punch against rotational movement with respect to the punch holder and said punch holder being radially adjustable within said socket.

4. A rotary cutting, punching and blanking machine or the like comprising a rotatable anvil roll, a rotatable punch carrier roll, a threaded socket radially disposed within said carrier roll, a threaded punch holder fitted within said socket, an annular groove on the outer circumference of said punch holder, a punch having an annular groove on the inner circumference thereof, a snap ring disposed within the grooves to removably secure the punch to the punch holder, a locating pin within said socket, a slot in the punch, said slot and locating pin cooperating to prevent the punch from rotational movement with respect to the punch holder, said punch having a cutting edge of predetermined contour equal to the radius of said anvil roll and said punch holder being radially adjustable within said socket.

5. A rotary cutting, punching and blanking machine or the like comprising a rotatable anvil roll, a rotatable punch carrier roll, a threaded socket radially disposed within said carrier roll, a threaded punch holder fitted within said socket, an annular groove on the outer circumference of said punch holder, a punch having an annular groove on the inner circumference thereof, a snap ring disposed within the grooves to removably secure the punch to the punch holder, a locating pin within said socket, a slot in the punch, said slot and locating pin cooperating to prevent the punch from rotational movement with respect to the punch holder, said punch having a cutting edge of predetermined contour equal to the radius of said anvil roll, said punch holder being radially adjustable within said socket and means for locking the punch holder within the socket to prevent radial movement.

6. A rotary cutting, punching and blanking machine or the like comprising a rotatable anvil roll, a rotatable punch carrier roll, a threaded socket radially disposed within said punch carrier roll, a hollow threaded punch holder fitting within said socket, vertical slots circumferentially disposed on the lower portion of said punch holder, a punch removably fixed to said punch holder, said punch having a cutting edge of predetermined contour equal to the radius of said anvil roll, said punch holder being radially adjustable within said socket, and a tapered locking plug adapted to expand the punch holder against the threaded socket.

7. A rotary cutting, punching and blanking machine or the like comprising a rotatable anvil roll, a rotatable punch carrier roll, a threaded socket radially disposed within said punch carrier roll, a hollow threaded punch holder fitted within said socket, an annular groove on the outer circumference of said punch holder, a punch having a cutting edge of predetermined contour equal to the radius of said anvil roll, an annular groove on the inner circumference of said punch, a snap ring disosed within said grooves to secure the punch to the punch holder, a locating pin within the socket, a slot within the punch adapted to cooperate with the locating pin to thereby prevent rotation of the punch within the socket, vertical slots circumferentially disposed on the lower portion of said punch holder, and a tapered plug for locking the punch holder within the carrier roll against radial movement.

8. A rotary cutting, punching and blanking machine or the like comprising a rotatable anvil roll, a rotatable punch carrier roll, a threaded socket radially disposed within said punch carrier roll, a threaded punch holder fitted within said socket, a punch removably fixed to said punch holder, said punch having a cutting edge of predetermined contour equal to the radius of said anvil roll, said punch holder being radially adjustable within said socket and a spring actuated spindle disposed within the punch.

9. A rotary cutting, punching and blanking machine or the like comprising a rotatable anvil roll, a rotatable punch carrier roll, a threaded socket radially disposed within said punch carrier roll, a hollow threaded punch holder fitted within said socket, an annular groove on the outer circumference of said punch holder, a punch having a cutting edge of predetermined contour equal to the radius of said anvil roll, an annular groove on the inner circumference of said punch, a snap ring disposed within said grooves to secure the punch to the punch holder, a locating pin within the socket, a slot within the punch adapted to cooperate with the locating pin to thereby prevent rotation of the punch within the socket, vertical slots circumferentially disposed on the lower portion of said punch holder, a tapered plug for locking the punch holder within the carrier roll against radial movement, and compressible means disposed within said punch to eject a cut-out.

10. A device of the character described comprising a sleeve having a pin secured thereto, a hollow punch holder disposed within said sleeve, a punch removably secured to said punch holder, said punch holder having a slot therein, said pin and slot preventing rotation of the punch within the sleeve and means for imparting movement to the punch longitudinally with respect to said sleeve.

11. A rotary cutting, punching and blanking machine comprising a rotatable anvil roll, a rotatable punch carrier roll, a unitary punch assembly secured to said punch carrier roll, said punch assembly comprising a sleeve, a punch holder disposed within said sleeve, a punch removably secured to said punch holder, the cutting edge of said punch having a predetermined contour equal to the radius of said anvil roll, means for adjusting the punch longitudinally with respect to said sleeve to cause said cutting edge to smoothly contact the anvil roll upon rotation of anvil and punch carrier rolls and means for preventing rotation of said punch with respect to said sleeve.

12. A rotary cutting, punching and blanking machine comprising a rotatable anvil roll, a rotatable punch carrier roll, a unitary punch assembly secured to said punch carrier roll, said punch assembly comprising a sleeve, a punch holder disposed within said sleeve, a punch removably secured to said punch holder, the cutting edge of said punch having a predetermined contour equal to the radius of said anvil roll, means for adjusting the punch longitudinally with respect to said sleeve to cause said cutting edge to smoothly contact the anvil roll upon rotation of anvil and punch carrier rolls, means for preventing rotation of said punch with respect to said sleeve and means for locking the punch against movement within the sleeve.

JES ASMUSSEN.

REFERENCES CITED

The following references are of record in the file of this patent:

UNITED STATES PATENTS

| Number | Name | Date |
| --- | --- | --- |
| 388,977 | Hulme | Sept. 4, 1888 |
| 762,321 | Keyes | June 14, 1904 |
| 1,082,986 | Wilder | Dec. 30, 1913 |
| 1,650,314 | Ackerman | Nov. 22, 1927 |
| 1,669,999 | Olsen | May 15, 1928 |
| 1,750,708 | Edwards | Mar. 18, 1930 |
| 1,786,153 | Doyle | Dec. 23, 1930 |
| 2,009,288 | Beckmann | July 23, 1935 |
| 2,144,980 | Johanson | Jan. 24, 1939 |
| 2,220,270 | Page | Nov. 5, 1940 |
| 2,264,134 | Hawley | Nov. 25, 1941 |
| 2,270,639 | Parks | Jan. 20, 1942 |

FOREIGN PATENTS

| Number | Country | Date |
| --- | --- | --- |
| 627,356 | Germany | Mar. 13, 1935 |